US 12,459,530 B2
Nov. 4, 2025

(12) United States Patent
Tatebe et al.

(10) Patent No.: US 12,459,530 B2
(45) Date of Patent: Nov. 4, 2025

(54) VEHICLE SEAT

(71) Applicant: SUBARU CORPORATION, Tokyo (JP)

(72) Inventors: Takanori Tatebe, Tokyo (JP); Naoto Yabuki, Tokyo (JP); Koichi Hirota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 259 days.

(21) Appl. No.: 18/121,409

(22) Filed: Mar. 14, 2023

(65) Prior Publication Data

US 2023/0311925 A1 Oct. 5, 2023

(30) Foreign Application Priority Data

Apr. 1, 2022 (JP) ................. 2022-061673

(51) Int. Cl.
B60W 50/16 (2020.01)
B60N 2/90 (2018.01)

(52) U.S. Cl.
CPC ............ B60W 50/16 (2013.01); B60N 2/90 (2018.02); B60N 2002/981 (2018.02); B60W 2520/26 (2013.01)

(58) Field of Classification Search
CPC ............ B60W 50/16; B60W 2520/26; B60W 30/18145; B60W 2720/26; B60N 2/90; B60N 2002/981; B60N 2/986
See application file for complete search history.

(56) References Cited

U.S. PATENT DOCUMENTS

| | | | | |
|---|---|---|---|---|
| 2008/0174415 A1* | 7/2008 | Tanida | ................... | B62D 1/046 340/438 |
| 2011/0187516 A1* | 8/2011 | Makinen | ............... | B60W 50/16 340/425.5 |
| 2016/0107570 A1* | 4/2016 | Modarres | ............. | B62D 15/029 340/435 |
| 2018/0170371 A1* | 6/2018 | Kataoka | ............... | B62D 15/025 |
| 2020/0239022 A1* | 7/2020 | Hashimoto | ............ | G10K 15/02 |

FOREIGN PATENT DOCUMENTS

| | | |
|---|---|---|
| JP | 2008-077631 A | 4/2008 |
| JP | 2019-026216 A | 2/2019 |
| JP | 2021-093175 A | 6/2021 |

* cited by examiner

Primary Examiner — Brandon D Lee
(74) Attorney, Agent, or Firm — MCGINN I.P. LAW GROUP, PLLC

(57) ABSTRACT

A vehicle seat, in which an occupant of a vehicle is to be seated, includes one or more vibration application units and a vibration application control processor. The one or more vibration application units are each configured to apply vibration to a portion of the vehicle seat. The portion is to be in contact with the occupant. The vibration application control processor is configured to cause each of the one or more vibration application units to vibrate with a vibration application waveform. The vibration application waveform includes a frequency component that is higher than or equal to 100 hertz and lower than or equal to 300 hertz and has an amplitude that varies in accordance with acceleration acting on the vehicle.

8 Claims, 9 Drawing Sheets

VEHICLE SEAT

CROSS-REFERENCE TO RELATED APPLICATIONS

The present application claims priority from Japanese Patent Application No. 2022-061673 filed on Apr. 1, 2022, the entire contents of which are hereby incorporated by reference.

BACKGROUND

The disclosure relates to a vehicle seat in which an occupant of a vehicle is to be seated. As a technique related to, for example, a seat in which an occupant such as a driver of a vehicle is to be seated, for example, Japanese Unexamined Patent Application Publication No. 2008-077631 discloses an apparatus including, without limitation, a vehicle seat. The vehicle seat is configured to reliably present information without giving an unpleasant feeling or a sense of incongruity to a driver. The vehicle seat presents notification information indicating a detected risky situation by causing selected vibrators to vibrate in a prescribed order for the detected risky situation so that one or more of the frequency of vibration, presentation time of vibration, a vibration amplitude, and a presentation time interval of the vibrators match a human tactile sensation characteristic to a stimulus caused by the applied vibration and a driver perceives apparent movement phenomenon.

In order to present information to a user through somatosensory, Japanese Unexamined Patent Application Publication No. 2019-026216 discloses a technique to apply vibration to presentation surfaces provided on parts including a seating surface of a seat, a backrest, and an armrest. The vibration to be applied is vibration to which Meissner corpuscles and Pacinian corpuscles are reactable.

In order to increase driver's awareness of driving conditions and surroundings in a continuous yet intuitive manner to thereby more effectively improve the driver's capability to react to urgent situations, Japanese Unexamined Patent Application Publication No. 2021-93175 discloses a system for a vehicle including a haptic output device that determines haptic feedback for the system to display based on information associated with the surroundings, the environment, and the condition of the vehicle and generates the haptic feedback to a driver of the vehicle.

A technique to haptically provide information related to a vehicle movement such as slipping or turning is also disclosed.

SUMMARY

An aspect of the disclosure provides a vehicle seat in which an occupant of a vehicle is to be seated. The vehicle seat includes one or more vibration application units and a vibration application control processor. The one or more vibration application units are each configured to apply vibration to a portion of the vehicle seat. The portion is to be in contact with the occupant. The vibration application control processor is configured to cause each of the one or more vibration application units to vibrate with a vibration application waveform. The vibration application waveform includes a frequency component that is higher than or equal to 100 Hz and lower than or equal to 300 Hz and has an amplitude that varies in accordance with acceleration acting on the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
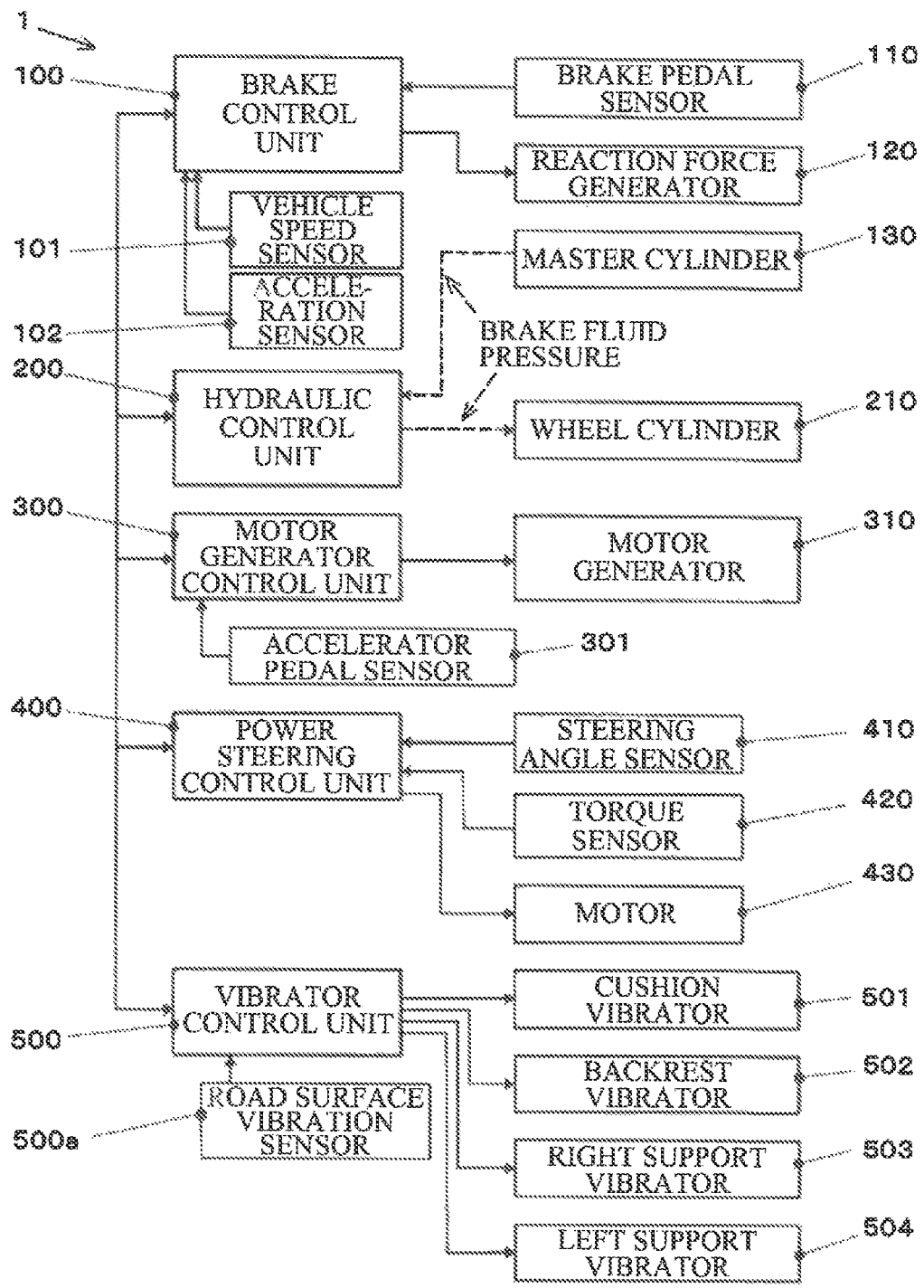
FIG. 1 is a diagram schematically illustrating a system configuration of a vehicle that includes a vehicle seat according to an example embodiment of the disclosure.

A driver feels a sense that a tire of a vehicle is gripping a road surface by pressure transmitted from a seat to his or her body part such as his or her back, hip, or buttocks. The driver determines stability of the vehicle based on the sense of gripping which the driver feels, and controls the vehicle, taking into consideration a surrounding situation.

It is possible to cause the vehicle to travel stably with higher accuracy as the driver perceives the pressure with higher accuracy.

However, receptors present at the body parts, including a back, a hip, and buttocks, that are in contact with the seat have relatively low sensitivity as compared with those present at a body part such as a hand or a foot. In addition, a driving skill greatly varies between individuals. Accordingly, a vehicle seat that allows an occupant to perceive the pressure easily may be desired.

It is desirable to provide a vehicle seat that allows an occupant to favorably perceive pressure.

A vehicle seat according to an embodiment of the disclosure is a vehicle seat in which an occupant of a vehicle is to be seated. The vehicle seat includes one or more vibration application units and a vibration application control processor. The one or more vibration application units are each configured to apply vibration to a portion of the vehicle seat. The portion is to be in contact with the occupant. The vibration application control processor is configured to cause each of the one or more vibration application units to vibrate with a vibration application waveform. The vibration application waveform includes a frequency component that is higher than or equal to 100 Hz and lower than or equal to 300 Hz and has an amplitude that varies in accordance with acceleration acting on the vehicle.

This makes it possible to emphasize variation in a sense of pressure to be felt by the occupant from the seat when the acceleration acts on the vehicle, by applying vibration to the portion to be in contact with the occupant with the vibration application waveform including the frequency component from 100 Hz to 300 Hz both inclusive. The frequency component from 100 Hz to 300 Hz both inclusive may be a frequency component that is highly sensed by Pacinian corpuscles. The Pacinian corpuscles are assumed to have sensitivity to pressure that is relatively high among human tactile receptors.

Accordingly, it is possible to allow the occupant to easily perceive the acceleration acting on the vehicle, and therefore to easily feel the sense of gripping of a tire. In addition, it is possible to allow for improvement in accuracy of situation determination and a driving operation to be performed by the occupant, which allows the occupant to drive easily and feel a sense of security.

According to an embodiment of the disclosure, the one or more vibration application units may include a first vibration application unit and a second vibration application unit that are disposed to be separated away from each other in one or both of a width direction of the vehicle and a front-rear direction of the vehicle. The vibration application control processor may be configured to cause the amplitude of the vibration application waveform of the first vibration application unit and the amplitude of the vibration application waveform of the second vibration application unit to be different from each other depending on a direction of the acceleration.

Accordingly, it is possible to allow the occupant to favorably perceive the acceleration by causing the amplitude of the vibration application waveform of the first vibration application unit and the amplitude of the vibration application waveform of the second vibration application unit to be different from each other depending on the direction of the acceleration.

For example, the first vibration application unit and the second vibration application unit may be disposed to be separated away from each other in the width direction of the vehicle. The amplitude of the vibration application waveform of one of the first and second vibration application units that is disposed on a side in an acting direction of the acceleration in the width direction of the vehicle may be made greater relative to the amplitude of the vibration application waveform of the other. For example, when centripetal acceleration acts upon turning, the amplitude of the vibration application waveform of the vibration application unit on the outer side of the turning may be made greater.

For example, the first vibration application unit and the second vibration application unit may be disposed to be separated away from each other in the front-rear direction of the vehicle. The amplitude of the vibration application waveform of one of the first and second vibration application units that is disposed on a side in an acting direction of the acceleration in the front-rear direction of the vehicle may be made greater relative to the amplitude of the vibration application waveform of the other. For example, the amplitude of the vibration application waveform of the vibration application unit on the rear side may be made greater relative to the amplitude of the vibration application waveform of the other upon acceleration, and the amplitude of the vibration application waveform of the vibration application unit on the front side may be made greater relative to the amplitude of the vibration application waveform of the other upon deceleration.

It is to be noted that as used in the specification and the claims, the wordings "the amplitude of the vibration amplitude waveform of one of the vibration application units is made greater relative to the amplitude of the vibration amplitude waveform of the other" and wordings similar thereto encompass a state where one of the vibration application units is in operation.

According to an embodiment of the disclosure, the vibration application control processor may be configured to increase the amplitude of the vibration application waveform in accordance with an increase in the acceleration, and to decrease a ratio of an amount of an increase in the amplitude of the vibration application waveform to an amount of the increase in the acceleration in accordance with an increase in an absolute value of the acceleration.

This increases the ratio of the amount of the increase in the amplitude of the vibration application waveform to the amount of the increase in the acceleration in a region where the acceleration is relatively small, making it possible to effectively allow the occupant to feel the occurrence of the acceleration.

According to an embodiment of the disclosure, the vehicle seat may further include a slip state detector. The vehicle may include a wheel. The slip state detector may be configured to perform detection of a slip state of the wheel. The vibration application control processor may be configured to decrease, based on the detection of the slip state, the amplitude of the vibration application waveform.

This makes it possible to emphasize the variation in the sense of pressure to be felt by the occupant from the seat when occurrence of the slip state of the wheel decreases lateral force that is to be produced by a tire and thereby causes a decrease or lack in lateral acceleration.

It is thus possible to allow the occupant to more appropriately recognize the sense of gripping of the vehicle, making it possible to further improve accuracy of the driving operation to be performed on the vehicle.

According to an embodiment of the disclosure, the vehicle seat may further include a vibration input detector. The vibration input detector may be configured to detect a vibration input from a road surface. The vibration application control processor may be configured to increase the amplitude of the vibration application waveform in accordance with an increase in an amplitude of the vibration input.

This makes it possible to secure the above-described effects by increasing the amplitude of the vibration application waveform even when the vibration transmitted from the road surface is increased, for example, by the roughness of the road surface or a pattern shape of the tire.

For example, as the vibration input detector, any of the following sensors may be used: an acceleration sensor that detects acceleration of an unsprung portion of the vehicle, that is, a portion that is movable with respect to a vehicle body in accordance with a stroke of the suspension; a torque sensor that detects torque acting on a steering shaft in a power steering system; and any other sensor.

For example, the vibration application control processor may extract a particular frequency band of the vibration input from the road surface, and may increase the amplitude of the vibration application waveform in accordance with an increase in the amplitude in the extracted band. The particular frequency band may typically be a band including a band from 100 Hz to 300 Hz both inclusive.

As described above, according to an embodiment of the disclosure, it is possible to provide a vehicle seat that allows an occupant to favorably perceive pressure.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the following, a description is given of a vehicle seat according to an example embodiment of the disclosure.

The vehicle seat according to the example embodiment may be provided in a vehicle such as a four-wheel passenger car, and may be a driver's seat in which a driver is to be seated to perform a driving operation.

FIG. 1 is a diagram schematically illustrating an example of a system configuration of a vehicle 1 that includes the vehicle seat according to the example embodiment.

In FIG. 1, a solid line indicates electrical coupling, and a dashed line indicates transmission of a hydraulic pressure of a brake fluid.

Figure 2:
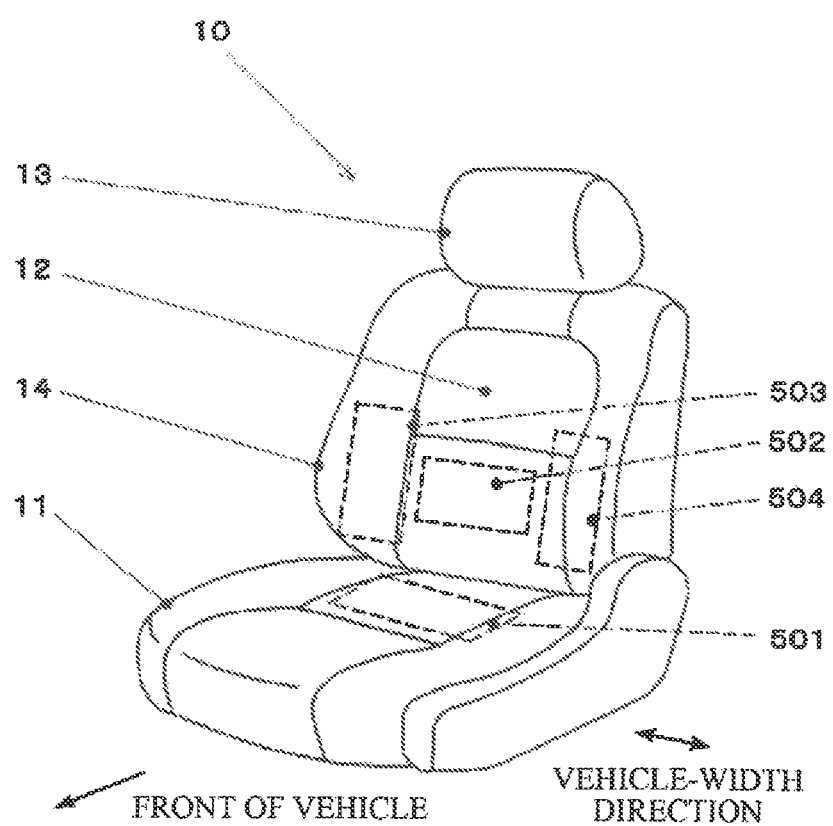
FIG. 2 is a diagram schematically illustrating locations to dispose vibrators in the vehicle seat according to the example embodiment.

FIG. 2 is a diagram schematically illustrating locations to dispose vibrators in the vehicle seat according to the example embodiment.

The vehicle 1 may include, for example, a seat 10, a brake control unit 100, a hydraulic control unit (HCU) 200, a motor generator control unit 300, a power steering control unit 400, and a vibrator control unit 500. For the seat 10, see FIG. 2.

The brake control unit 100, the hydraulic control unit 200, the motor generator control unit 300, the power steering control unit 400, and the vibrator control unit 500 may each include a microcomputer. The microcomputer may include, for example, a data processor, a storage, an input/output interface, and a bus. The data processor may be a central processing unit (CPU), for example. The storage may be a random-access memory (RAM) and a read-only memory (ROM), for example. The bus may couple the data processor, the storage, and the input/output interface to each other.

In addition, for example, the brake control unit 100, the hydraulic control unit 200, the motor generator control unit 300, the power steering control unit 400, and the vibrator control unit 500 may be coupled to each other via an in-vehicle local area network (LAN) or may be coupled directly to each other, thus being communicable with each other. The LAN network may be a controller area network (CAN) communication system, for example.

The brake control unit 100 may perform a regenerative-friction brake coordination control in accordance with an operation received by an unillustrated brake pedal. In the regenerative-friction brake coordination control, the brake control unit 100 may control a hydraulic friction brake and a regenerative brake in a coordinated manner.

In addition, the brake control unit 100 may perform an anti-lock brake control and a behavior stabilization control.

The anti-lock brake control may be a control of cyclically reducing braking force applied to a wheel when locking of rotation of the wheel, or a wheel lock, is detected while braking is performed.

The behavior stabilization control may be a control of generating a yaw moment in a restoring direction with use of a difference in braking force between right and left wheels upon occurrence of understeer behavior or oversteer behavior.

Coupled to the brake control unit 100 may be a vehicle speed sensor 101, an acceleration sensor 102, a brake pedal sensor 110, and a reaction force generator 120. In one embodiment, the vehicle control unit 100 and the vehicle speed sensor 101 may serve as a "slip state detector".

The vehicle 1 may further include a braking device. The braking device may include a master cylinder 130.

The vehicle speed sensor 101 may be provided at an unillustrated hub bearing housing. The hub bearing housing may rotatably support wheels. The vehicle speed sensor 101 may generate a vehicle speed signal corresponding to a rotation angular velocity of each of the wheels.

The brake control unit 100 may calculate a traveling speed, or a vehicle speed, of the vehicle 1 based on an output of the vehicle speed sensor 101.

The brake control unit 100 may detect an increase in wheel rotation speeds of some wheels with respect to other wheels, i.e., a slip-up, based on an output of the vehicle speed sensor 101 provided at each of the wheels. The increase in the wheel rotation speeds of some wheels with respect to other wheels may be caused by slipping of some wheels.

The acceleration sensor 102 may detect each of acceleration that acts on a vehicle body in a front-rear direction and acceleration that acts on the vehicle body in a vehicle-width direction.

The brake pedal sensor 110 may include an encoder. The encoder may detect an amount of an operation received by the brake pedal, i.e., a depressed amount of the brake pedal.

In accordance with a command given from the brake control unit 100, the reaction force generator 120 may generate reaction force in a direction in which the brake pedal returns to an initial position, i.e., a position of the brake pedal in a non-depressed state.

The reaction force generator 120 may generate the reaction force, for example, with use of a driving power source such as an electric actuator, for example, upon the use of the regenerative brake.

The master cylinder 130 may apply pressure to the brake fluid in accordance with a depressing operation of a depressing surface member of the brake pedal. The brake fluid may be a working fluid of the friction brake.

The brake fluid pressure generated by the master cylinder 130 may be transmitted to the hydraulic control unit 200 via a pipe.

The hydraulic control unit 200 may be a hydraulic pressure control device that individually adjusts the brake fluid pressure of a wheel cylinder 210 of each of the wheels.

The hydraulic control unit 200 may include an electric pump that applies pressure to the brake fluid. The hydraulic control unit 200 may also include valves that control the brake fluid pressure of the wheel cylinder 210 of each of the wheels. Such valves may include, for example, a pressure-increasing valve, a pressure-reducing valve, and a pressure holding valve.

For example, the master cylinder 130 and the wheel cylinder 210 may be coupled to the hydraulic control unit 200 via a brake fluid pipe.

The brake fluid pressure generated by the master cylinder 130 may be transmitted to the wheel cylinder 210 via the hydraulic control unit 200.

The hydraulic control unit 200 may increase and decrease the brake fluid pressure of the wheel cylinder 210 of each of the wheels generated by the master cylinder 130.

The wheel cylinder 210 may be provided for each of the wheels. The wheel cylinder 210 may generate friction force or braking force corresponding to the brake fluid pressure by pressing a brake pad against a disc rotor, for example.

In addition, when the brake control unit 100 performs the regenerative-friction brake coordination control, if the control of the regenerative brake is performed and a ratio of the control of the regenerative brake to the control of the hydraulic friction brake increases, the hydraulic control unit 200 may reduce or block the brake fluid pressure transmitted from the master cylinder 130.

In this case, the driver can feel as if the hydraulic friction brake is used. The brake control unit 100 may therefore generate the reaction force of the brake pedal with use of the reaction force generator 120.

The motor generator control unit 300 may comprehensively control a motor generator 310 and accessories thereof.

The motor generator 310 may be a rotating electric machine that is to be used as a traveling power source of the vehicle 1.

The motor generator control unit 300 may include an inverter, for example. The inverter may be configured to supply the motor generator 310 with electric power supplied from a power source such as a traveling battery.

For example, the motor generator 310 may be mounted on the vehicle body or a sprung portion, and may transmit driving force to the wheels via components including, without limitation, a differential and a drive shaft. However, this is non-limiting. Alternatively, the motor generator 310 may be an in-wheel motor, for example.

The motor generator control unit 300 may perform switching between a driving mode and a regeneration mode. The driving mode may be a mode in which the motor generator 310 generates output torque. The regeneration mode may be a mode in which the motor generator 310 performs regeneration to thereby absorb torque transmitted from the wheel side and generate braking force.

In the driving mode, the motor generator control unit 300 may perform a control in such a manner that actual torque generated by the motor generator 310 matches required torque. The required torque may be set based on, for example, an amount of an operation received by an unillustrated accelerator pedal, i.e., an operation amount of the accelerator pedal, that is detected by an accelerator pedal sensor 301.

In the regeneration mode, the motor generator control unit 300 may control the torque absorbed by the motor generator 310 in accordance with requested braking force in a command given by the brake control unit 100.

The power steering control unit 400 may comprehensively control an electric power steering system. The electric power steering system may supply an unillustrated steering device, for example, with assist force corresponding to a steering operation performed by the driver and with steering force for automatic steering. The steering device may perform steering of wheels of the vehicle 1 to be steered. The wheels of the vehicle 1 to be steered may typically be front wheels.

Coupled to the power steering control unit 400 may be a steering angle sensor 410, a torque sensor 420, and a motor 430, for example.

The steering angle sensor 410 may be a sensor that detects a steering angle of the steering device, i.e., a steering angle detector.

The torque sensor 420 may detect torque applied to a steering shaft to which an unillustrated steering wheel is coupled. The steering wheel may receive a steering operation performed by the driver.

The power steering control unit 400 may control the assist force in accordance with, for example, the torque detected by the torque sensor 420.

The motor 430 may be an electric actuator that applies the assist force and the steering force to the steering device and generates rack thrust.

The output of the motor 430 may be controlled by the power steering control unit 400.

The vibrator control unit 500 may supply a driving current having a predetermined vibration application waveform and a driving voltage having a predetermined vibration application waveform to a cushion vibrator 501, a backrest vibrator 502, a right support vibrator 503, and a left support vibrator 504. In one embodiment, the vibrator control unit 500 may serve as a "vibration application control processor". In one embodiment, the cushion vibrator 501, the backrest vibrator 502, the right support vibrator 503, and the left support vibrator 504 may serve as "one or more vibration application units".

The cushion vibrator 501, the backrest vibrator 502, the right support vibrator 503, and the left support vibrator 504 may each include a voice coil and a diaphragm, for example. The voice coil and the diaphragm may generate vibration corresponding to variation in the supplied voltage.

For example, a small speaker may be used as each of the cushion vibrator 501, the backrest vibrator 502, the right support vibrator 503, and the left support vibrator 504.

FIG. 2 is a diagram schematically illustrating locations to dispose vibrators in the vehicle seat according to the example embodiment.

The seat 10 in which the driver of the vehicle 1 is to be seated may include, for example, a seat cushion 11, a backrest 12, a headrest 13, and a side support 14.

The seat cushion 11 may be a seating surface member on which the driver's buttocks and thighs, which are not illustrated, are to be placed.

The seat cushion 11 may be attached to an unillustrated floor panel with use of an unillustrated seat rail. The floor panel may be a portion of a floor of a vehicle compartment.

The seat cushion 11 may include an upper surface extending along a front-rear direction of the driver and a shoulder-width direction of the driver.

The backrest 12, which may also be called a seat back, may be a backrest part provided to face the back of the driver's upper body.

The backrest 12 may protrude from the vicinity of a rear end of the seat cushion 11 obliquely on an upper-rear side.

An upper end of the backrest 12 may be to be positioned on a rear side of the driver's shoulders upon normal use of the vehicle 1.

The headrest 13 may be a member that is to be provided on the rear side of the driver's head and is to hold the driver's head when the driver's head pivots in a rear inclination direction with respect to the seat 10.

The headrest 13 may protrude from the upper end of the backrest 12 on an upper side.

The side support 14 may be a member that protrudes from right and left ends of the backrest 12 toward a front side.

The side support 14 may come into contact with lateral sides of the driver's body and support the driver's body, for example, when lateral acceleration, that is, acceleration in the vehicle-width direction, acts on the vehicle body. The lateral sides of the driver's body may be, for example, the driver's sides or right and left sides of the driver's waist. For example, the lateral acceleration acts on the vehicle body when the vehicle 1 turns.

The seat cushion 11, the backrest 12, the headrest 13, and the side support 14 may each include, for example, an elastic member around a frame to have an impact absorption property or a cushioning property. The elastic body may be, for example, a urethane foam that is a porous body. The frame may include, for example, a metal material such as steel.

A surface of the elastic body may be provided with, for example, a seat surface member including a material such as fabrics, natural leather, or artificial leather.

The cushion vibrator 501, the backrest vibrator 502, the right support vibrator 503, and the left support vibrator 504 may each be disposed adjacent to a back surface of the seat surface member, that is, a surface on an opposite side to a surface that comes into contact with the driver, and apply vibration to a front surface of the seat surface member.

The cushion vibrator 501 may be disposed in a region that is on the upper surface of the seat cushion 11 and is to face the driver's buttocks.

The cushion vibrator 501 may be disposed on the front side relative to the backrest vibrator 502.

The backrest vibrator 502 may be disposed on a front surface of the backrest 12 and may be to face the driver's back.

In one embodiment, the cushion vibrator 501 and the backrest vibrator 502 may serve as a "first vibration application unit" and a "second vibration application unit" regarding acceleration in a front-rear direction of a vehicle.

The right support vibrator 503 may be disposed to face the driver's right side body in the side support 14 on the right side viewed from the driver.

The left support vibrator 504 may be disposed to face the driver's left side body in the side support 14 on the left side viewed from the driver.

In one embodiment, the right support vibrator 503 and the left support vibrator 504 may serve as the "first vibration application unit" and the "second vibration application unit" regarding acceleration in a right-left direction, i.e., a width direction of a vehicle.

The vibrator control unit 500 may include a road surface vibration sensor 500a that detects vibration from a road surface.

The road surface vibration sensor 500a may be provided at a so-called unsprung portion in an unillustrated suspension. The suspension may support the wheel with respect to the vehicle body in a strokable manner.

The road surface vibration sensor 500a may detect, for example, vertical acceleration of a member provided on an unsprung side. Non-limiting examples of the member provided on the unsprung side may include a suspension arm and the hub bearing housing.

In one embodiment, the road surface vibration sensor 500a may serve as a "vibration input detector". The vibration input detector may detect a vibration input from a road surface.

Figure 3:
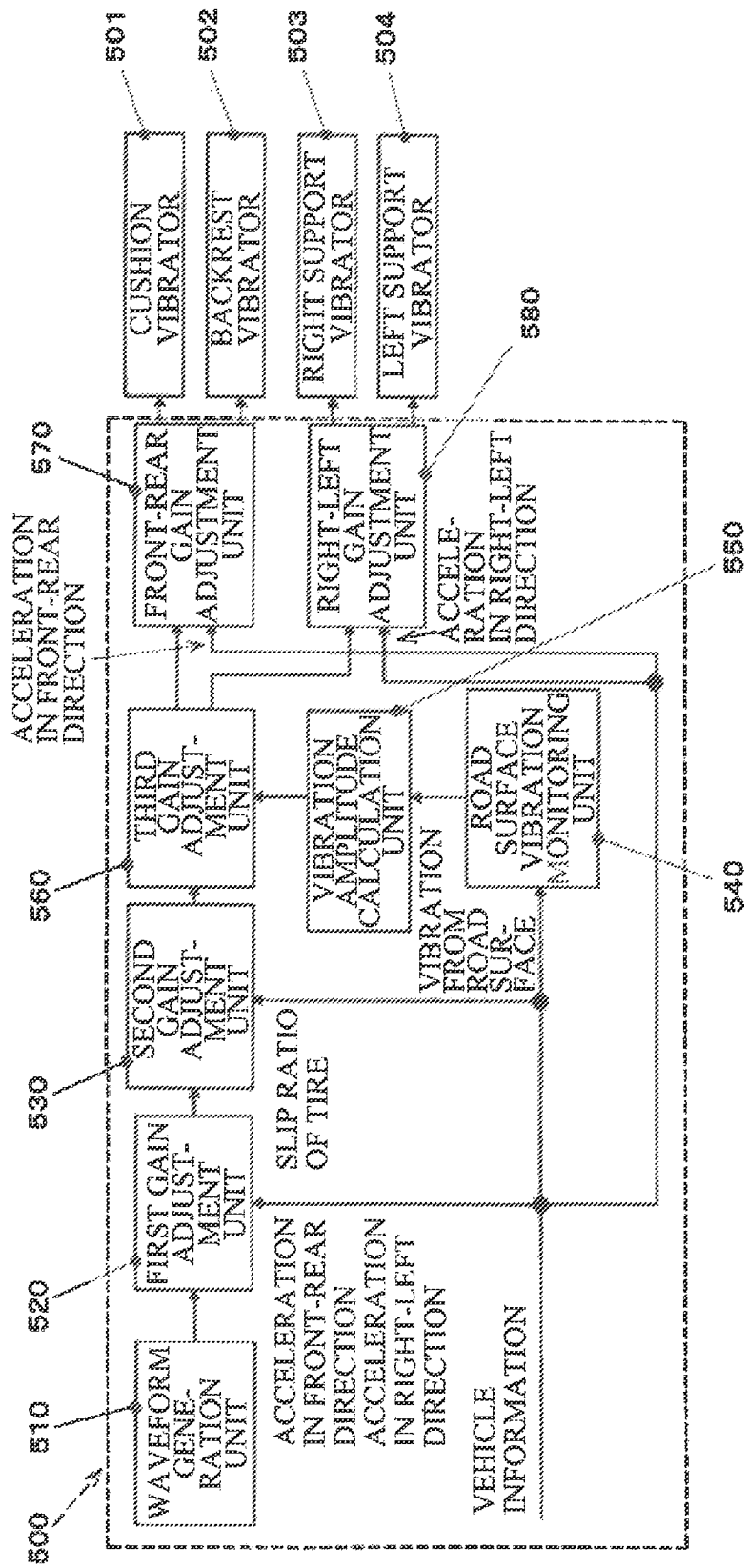
FIG. 3 is a diagram schematically illustrating a configuration of a vibrator control unit according to the example embodiment.

FIG. 3 is a diagram schematically illustrating a configuration of the vibrator control unit 500 according to the example embodiment.

The vibrator control unit 500 may include, for example, a waveform generation unit 510, a first gain adjustment unit 520, a second gain adjustment unit 530, a road surface vibration monitoring unit 540, a vibration amplitude calculation unit 550, a third gain adjustment unit 560, a front-rear gain adjustment unit 570, a right-left gain adjustment unit 580, and any other unit.

The waveform generation unit 510 may generate a basic wave of a vibration application waveform that is a voltage waveform of driving electric power for the cushion vibrator 501, the backrest vibrator 502, the right support vibrator 503, and the left support vibrator 504. The basic wave may be a wave that has not yet subjected to adjustment such as gain adjustment.

Figure 4:
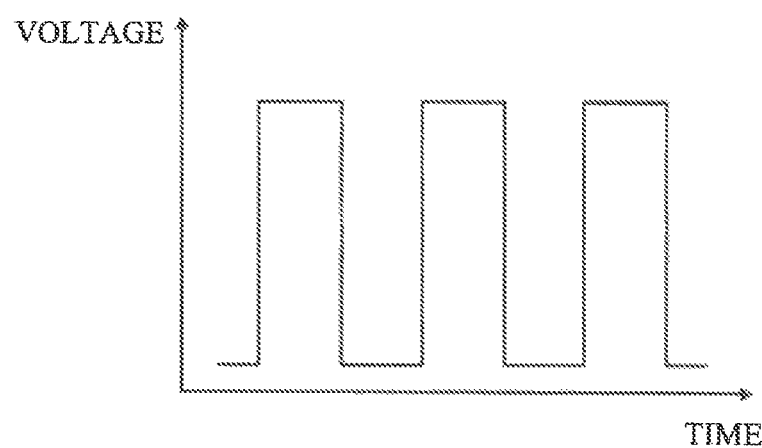
FIG. 4 is a diagram schematically illustrating an example of a vibration application waveform according to the example embodiment.

FIG. 4 is a diagram schematically illustrating an example of the vibration application waveform according to the example embodiment.

In FIG. 4, the horizontal axis represents time, and the vertical axis represents a voltage.

As illustrated in FIG. 4, the vibration application waveform may be a rectangular wave, for example. However, the vibration application waveform is not particularly limited thereto and may be any other waveform.

According to the example embodiment, the frequency of the vibration application waveform may be set to have a dominant frequency within a range from 100 Hz to 300 Hz both inclusive, for example.

Note that, as used herein, the "dominant frequency" refers to a frequency having an amplitude relatively great as compared with other frequencies. Generally, the dominant frequency may often be substantially the same as a frequency that has a relatively great amplitude among natural values or natural frequencies.

Reasons why the frequency of the vibration application waveform may be set to have the above-described dominant frequency will be described below.

Examples of sensory receptors, or tactile sensors, by which the driver's body touching the seat 10 acquires a tactile sensation, or skin sensation, may include Merkel cells, Meissner corpuscles, and Pacinian corpuscles.

Figure 5:
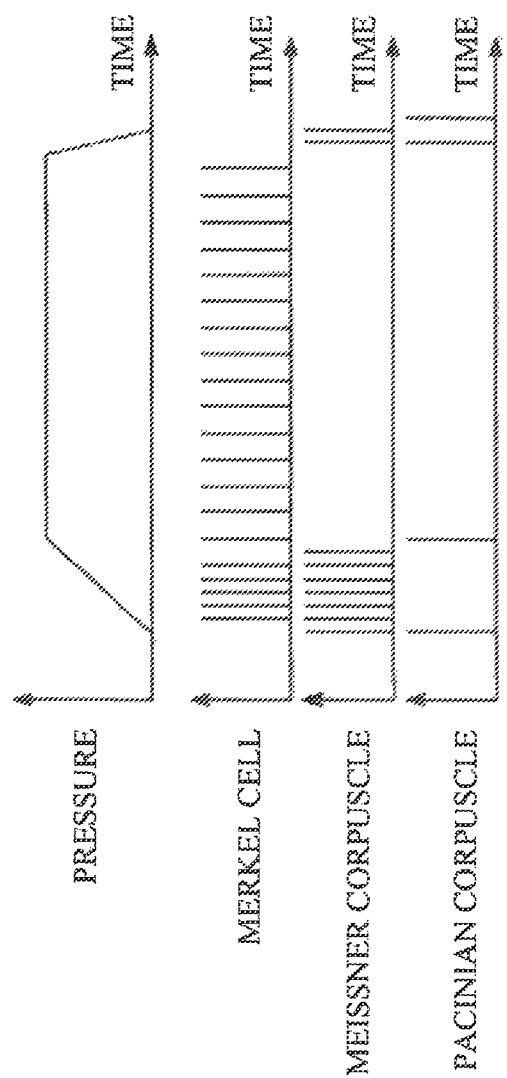
FIG. 5 is a diagram schematically illustrating timings of electric pulses outputted by respective receptors when the skin receives pressure.

FIG. 5 is a diagram schematically illustrating timings of electric pulses outputted by respective receptors when the skin touches an object.

In FIG. 5, the horizontal axes represent time, and the vertical axes represent, in order from the top, pressure, an electric pulse generation state of the Merkel cells, an electric pulse generation state of the Meissner corpuscles, and an electric pulse generation state of the Pacinian corpuscles.

The Merkel cells respond relatively slowly and may react to a DC component.

The Meissner corpuscles may react to a situation where a rate of variation in contact pressure, i.e., a speed, is present.

Because the Meissner corpuscles usually react when the speed is present, if the vibration application waveform having a frequency to which the Meissner corpuscles are highly sensitive is used, the vibration application waveform may be easily sensed as vibration by the driver.

The Pacinian corpuscles may correspond to a transient variation moment. The Pacinian corpuscles may be the most sensitive among the above-described receptors.

It is assumable that the Pacinian corpuscles are dominant among receptors by which the driver senses small variation in pressure from a portion of the driver in contact with a seat.

Figure 6:
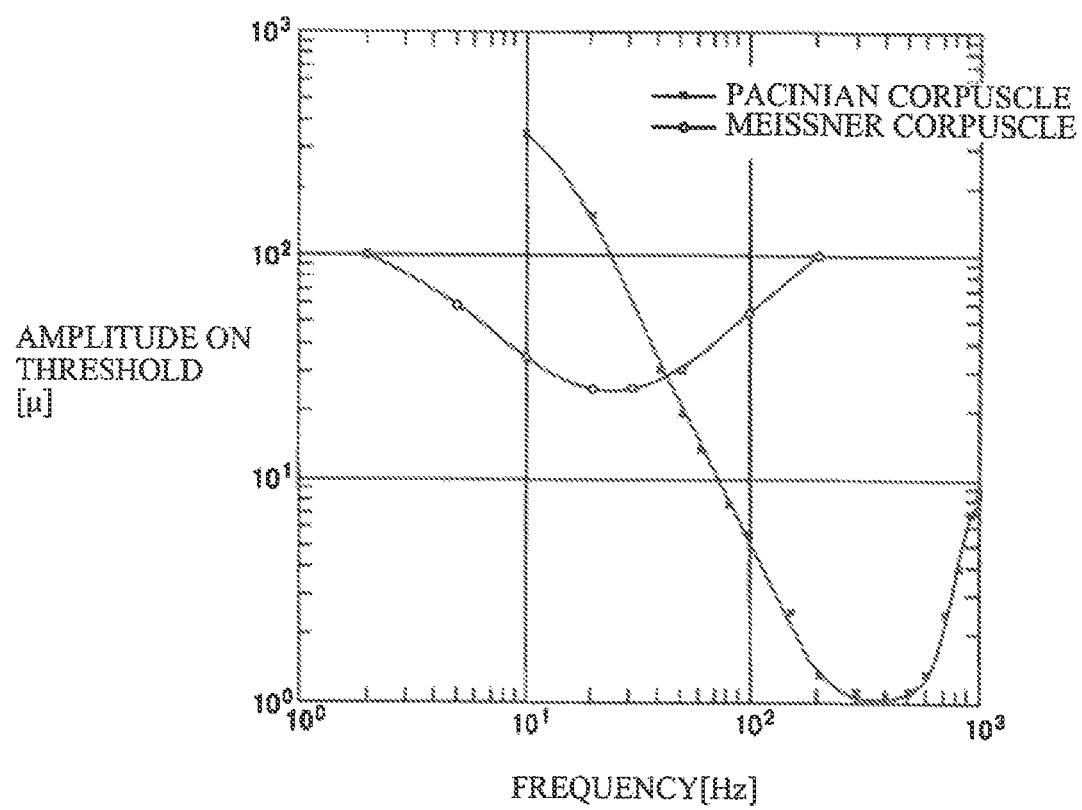
FIG. 6 is a diagram illustrating respective sensitivity distributions of Pacinian corpuscles and Meissner corpuscles with respect to a frequency.

FIG. 6 is a diagram illustrating respective sensitivity distributions of the Pacinian corpuscles and the Meissner corpuscles with respect to a frequency.

In FIG. 6, the horizontal axis represents the frequency. The vertical axis represents an amplitude on a threshold, and the smaller value represents higher sensitivity.

As illustrated in FIG. 6, the Pacinian corpuscles have favorable sensitivity around a region from 100 Hz to 300 Hz both inclusive. For this reason, the vibration application waveform having the dominant frequency within the frequency band from 100 Hz to 300 Hz both inclusive may be used in the example embodiment.

The first gain adjustment unit 520 may perform first gain adjustment on the vibration application waveform. The first gain adjustment will be described below.

The first gain adjustment may vary the gain of the vibration application waveform in accordance with variation in an absolute value of the acceleration in each of the front-rear direction and the right-left direction that acts on the vehicle 1.

Figure 7:
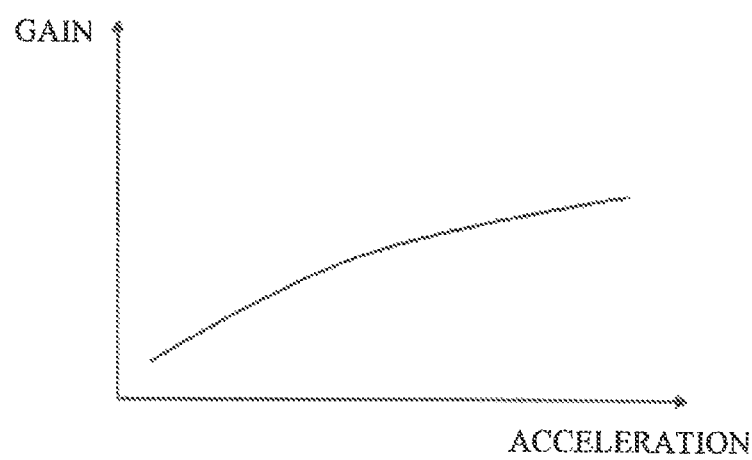
FIG. 7 is a diagram schematically illustrating an example of gain adjustment to be performed by a first gain adjustment unit.

FIG. 7 is a diagram schematically illustrating an example of gain adjustment to be performed by the first gain adjustment unit 520.

In FIG. 7, the horizontal axis represents the acceleration, for example, an absolute value of sum of vectors of the acceleration in the front-rear direction and the acceleration in the right-left direction. The vertical axis represents the gain by which the vibration application waveform is to be multiplied.

For example, the gain may be increased in accordance with the increase in the acceleration.

Non-limiting examples of a parameter usable instead of the acceleration in the right-left direction may include a detected value of the steering angle sensor 410 and a detected value of the torque sensor 420 of the electric power steering system.

Non-limiting examples of a parameter on an acceleration side usable instead of the acceleration in the front-rear direction may include the operation amount of the accelerator pedal detected by the accelerator pedal sensor 301 and various parameters correlated to the output of the traveling power source of the vehicle 1 such as requested torque.

Non-limiting examples of a parameter on a deceleration side usable instead of the acceleration in the front-rear direction may include the operation amount of the brake pedal detected by the brake pedal sensor 110, a brake fluid pressure, and a regeneration amount of the motor generator 310.

The first gain adjustment unit 520 may use any of the foregoing various parameters instead of or together with the acceleration.

For example, when the gain adjustment is performed in accordance with an amount of an operation performed by the driver, it is possible to increase predictability of the driver by improving responsiveness, i.e., the first gain adjustment to be performed in accordance with the amount of the operation performed by the driver.

The second gain adjustment unit 530 may perform second gain adjustment on the vibration application waveform that has already been subjected to the first gain adjustment. The second gain adjustment will be described below.

The second gain adjustment may be gain adjustment to be performed in accordance with a slip ratio of a tire of the vehicle 1.

The brake control unit 100 may calculate the slip ratio of each wheel based on the output of the vehicle speed sensor 101 provided for the corresponding wheel and supply the calculated slip ratio to the vibrator control unit 500.

Figure 8:
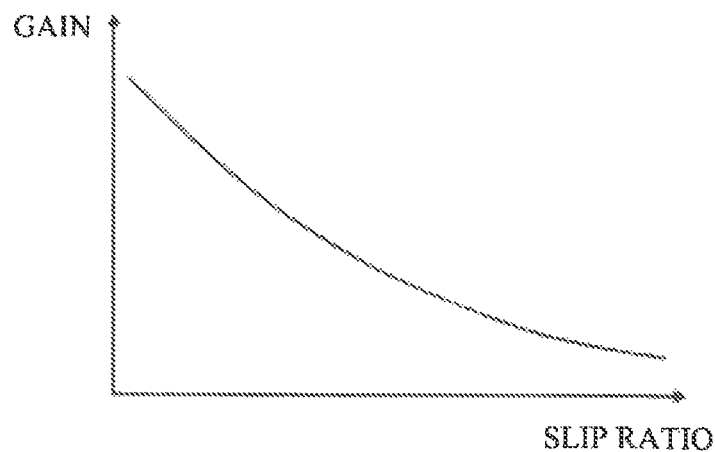
FIG. 8 is a diagram schematically illustrating an example of gain adjustment to be performed by a second gain adjustment unit.

FIG. 8 is a diagram schematically illustrating an example of the gain adjustment to be performed by the second gain adjustment unit 530.

In FIG. 8, the horizontal axis represents the slip ratio of the tire of the wheel having the highest slip ratio. In one example, the wheel having the highest slip ratio may be a rear wheel. However, the wheel having the highest slip ratio may be a front wheel. The vertical axis represents the gain by which the vibration application waveform is to be multiplied.

For example, the gain may be decreased in accordance with an increase in the slip ratio. In one example, the gain may be decreased in a log function manner in accordance with the increase in the slip ratio.

The road surface vibration monitoring unit 540 may monitor the output of the road surface vibration sensor 500a and hold a history of the output, i.e., an output history, for a predetermined period.

Figure 9:
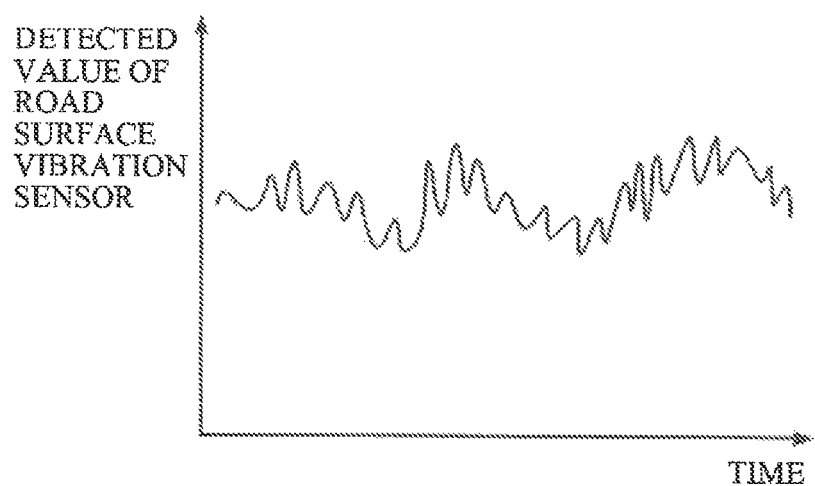
FIG. 9 is a diagram schematically illustrating an example of an output history of a road surface vibration sensor.

FIG. 9 is a diagram schematically illustrating an example of the output history of the road surface vibration sensor 500a.

In FIG. 9, the horizontal axis represents time, and the vertical axis represents a detected value of the road surface vibration sensor 500a, i.e., the vertical acceleration of the unsprung portion.

Data regarding the output history of the road surface vibration sensor 500a may be supplied to the vibration amplitude calculation unit 550.

The vibration amplitude calculation unit 550 may extract a component of a particular frequency region by performing bandpass filtering on the output of the road surface vibration sensor 500a supplied from the road surface vibration monitoring unit 540. The vibration amplitude calculation unit 550 may calculate a vibration amplitude in the particular frequency region.

Figure 10:
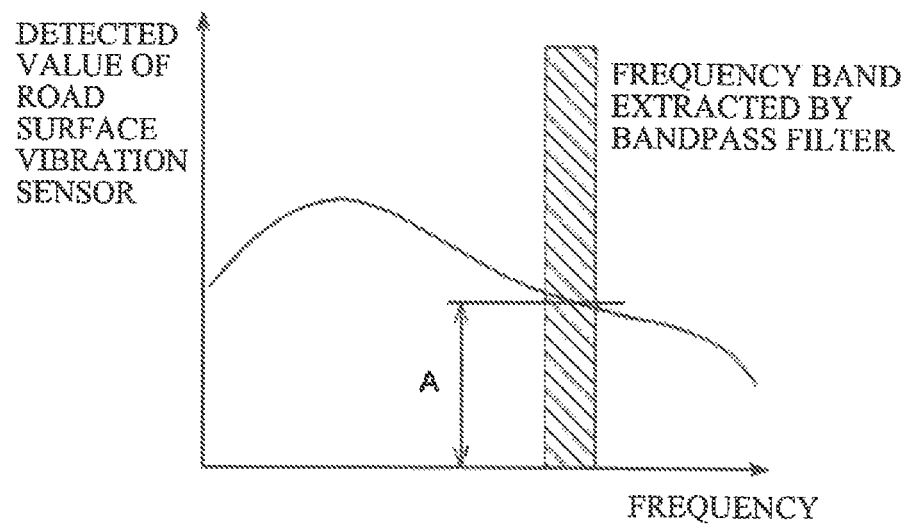
FIG. 10 is a diagram schematically illustrating a method of calculating a vibration amplitude by a vibration amplitude calculation unit.

FIG. 10 is a diagram schematically illustrating a method of calculating the vibration amplitude by the vibration amplitude calculation unit 550.

In FIG. 10, the horizontal axis represents a frequency, and the vertical axis represents the detected value of the road surface vibration sensor 500a.

A bandpass filter may be configured to extract, for example, a frequency band of a portion included in the band from 100 Hz to 300 Hz both inclusive. Such a frequency band may be a frequency band around 250 Hz, for example.

Information regarding a vibration amplitude A in the extracted frequency band may be supplied to the third gain adjustment unit 560. The vibration amplitude A may be an average value of the frequency band, for example.

The third gain adjustment unit 560 may perform third gain adjustment on the vibration application waveform that has already been subjected to the second gain adjustment. The third gain adjustment will be described below.

The third gain adjustment unit 560 may perform the third gain adjustment based on respective outputs of the road surface vibration monitoring unit 540 and the vibration amplitude calculation unit 550.

Figure 11:
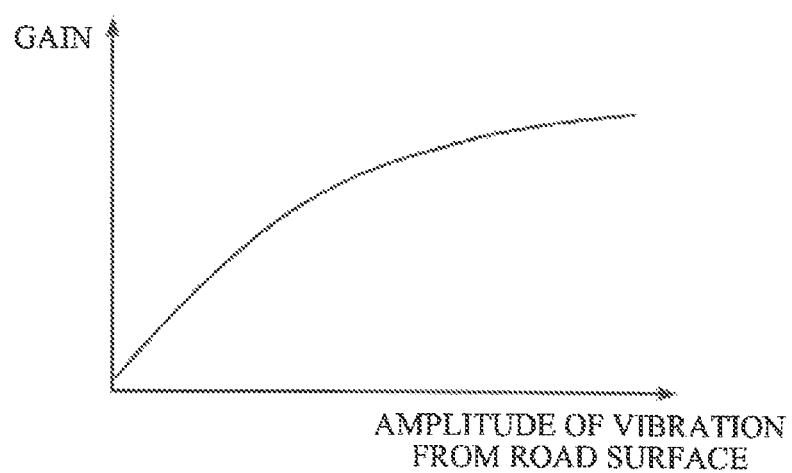
FIG. 11 is a diagram schematically illustrating an example of gain adjustment to be performed by a third gain adjustment unit.

FIG. 11 is a diagram schematically illustrating an example of gain adjustment to be performed by the third gain adjustment unit 560.

In FIG. 11, the horizontal axis represents the vibration amplitude calculated by the vibration amplitude calculation unit 550, and the vertical axis represents the gain by which the vibration application waveform is multiplied.

As illustrated in FIG. 11, the third gain adjustment unit 560 may increase the gain in accordance with an increase in the amplitude of vibration from the road surface.

Regarding the third gain adjustment unit 560, it is assumable that AA/A is the Weber fraction W where AA is the vibration application amplitude added by each vibrator and A is the amplitude of the vibration from the road surface obtained from the vibration amplitude calculation unit 550.

Accordingly, it is assumable that a stable effect is obtainable according to the Weber-Fechner law by performing the gain adjustment in such a manner that the above-described Weber fraction W becomes a predetermined value set in advance.

The front-rear gain adjustment unit 570 may set an amplitude of the vibration application waveform of each of the cushion vibrator 501 and the backrest vibrator 502 by further multiplying the vibration application waveform supplied by the third gain adjustment unit 560 by the gain described below.

Figure 12:
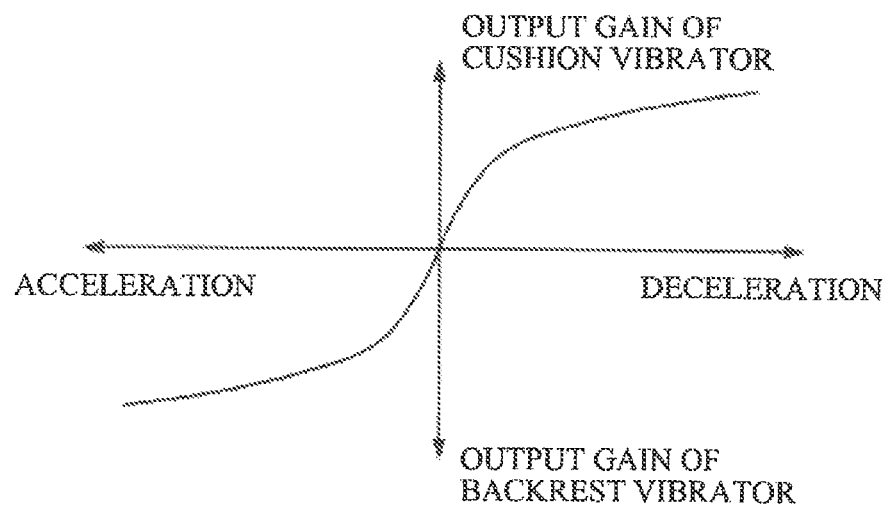
FIG. 12 is a diagram schematically illustrating an example of gain adjustment to be performed by a front-rear gain adjustment unit.

FIG. 12 is a diagram schematically illustrating an example of gain adjustment to be performed by the front-rear gain adjustment unit 570.

In FIG. 12, the horizontal axis represents the acceleration in the front-rear direction of the vehicle 1. The acceleration in a decreasing direction, i.e., deceleration, is illustrated on the right side relative to the vertical axis, and the acceleration in an increasing direction is illustrated on the left side relative to the vertical axis.

The vertical axis represents the gain of each vibrator. An output gain of the cushion vibrator 501 is illustrated on the upper side relative to the horizontal axis, and an output gain of the backrest vibrator 502 is illustrated on the lower side relative to the horizontal axis.

As illustrated in FIG. 12, an absolute value of the output gain of the cushion vibrator 501 may increase in accordance with an increase in an absolute value of the acceleration in the decreasing direction, i.e., the deceleration. In one example, the backrest vibrator 502 may apply no vibration in a region where the cushion vibrator 501 applies vibration. Alternatively, the backrest vibrator 502 may apply vibration with an amplitude smaller than that of the vibration applied by the cushion vibrator 501 in such a region.

An absolute value of the output gain of the backrest vibrator 502 may increases in accordance with an increase in an absolute value of the acceleration in the increasing direction. In one example, the cushion vibrator 501 may apply no vibration in a region where the backrest vibrator 502 applies vibration. Alternatively, the cushion vibrator 501 may apply vibration with an amplitude smaller than that of the vibration applied by the backrest vibrator 502 in such a region.

In addition, regarding both the output gains of the cushion vibrator 501 and the backrest vibrator 502, a rate of variation in the absolute value of the output gain to the variation in the absolute value of the acceleration, i.e., the slope of the line illustrated in FIG. 12, may decrease in accordance with the increase in the absolute value of the acceleration.

The cushion vibrator 501 and the backrest vibrator 502 may each be driven based on the vibration application waveform supplied by the front-rear gain adjustment unit 570 and thereby apply vibration to the surface of the seat 10.

The right-left gain adjustment unit 580 may set an amplitude of a vibration application waveform of each of the right support vibrator 503 and the left support vibrator 504 by further multiplying the vibration application waveform supplied by the third gain adjustment unit 560 by the gain described below.

Figure 13:
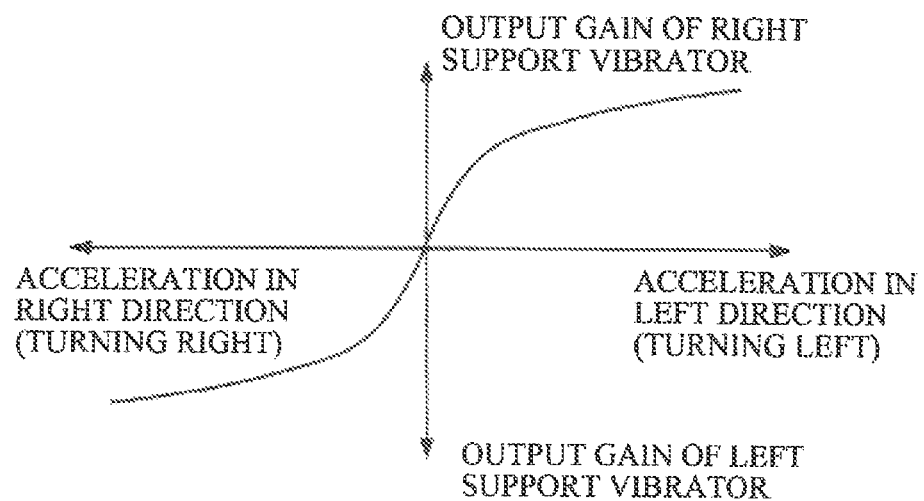
FIG. 13 is a diagram schematically illustrating an example of gain adjustment to be performed by a right-left gain adjustment unit.

FIG. 13 is a diagram schematically illustrating an example of gain adjustment to be performed by the right-left gain adjustment unit 580.

In FIG. 13, the horizontal axis represents the acceleration in the right-left direction of the vehicle 1. The acceleration in a left direction, which may typically be centripetal acceleration at the time of turning left, is illustrated on the right side relative to the vertical axis, and the acceleration in a right direction, which may typically be centripetal acceleration at the time of turning right, is illustrated on the left side of the vertical axis.

The vertical axis represents the gain of each vibrator. An output gain of the right support vibrator 503 is illustrated on the upper side relative to the horizontal axis, and an output gain of the left support vibrator 504 is illustrated on the lower side relative to the horizontal axis.

As illustrated in FIG. 13, an absolute value of the output gain of the right support vibrator 503 may increase in accordance with an increase in an absolute value of the acceleration in the left direction. In one example, the left support vibrator 504 may apply no vibration in a region where the right support vibrator 503 applies vibration. Alternatively, the left support vibrator 504 may apply vibration with an amplitude smaller than that of the vibration applied by the right support vibrator 503 in such a region.

An absolute value of the output gain of the left support vibrator 504 may increase in accordance with an increase in an absolute value of the acceleration in the right direction. In one example, the right support vibrator 503 may apply no vibration in a region where the left support vibrator 504 applies vibration. Alternatively, the right support vibrator 503 may apply vibration with an amplitude smaller than that of the vibration applied by the left support vibrator 504 in such a region.

In addition, regarding both the output gains of the right support vibrator 503 and the left support vibrator 504, a rate of variation in the absolute value of the output gain to the variation in the absolute value of the acceleration, i.e., the slope of the line illustrated in FIG. 13, may decrease in accordance with the increase in the absolute value of the acceleration.

The right support vibrator 503 and the left support vibrator 504 may each be driven based on the vibration application waveform supplied by the right-left gain adjustment unit 580 and thereby apply vibration to the surface of the seat 10.

According to the example embodiment described above, it is possible to achieve the following effects.

(1) Vibration may be applied to the part to be in contact with the driver with the vibration application waveform having the frequency component from 100 Hz to 300 Hz both inclusive. The frequency component from 100 Hz to 300 Hz both inclusive may be a frequency component that is highly sensed by Pacinian corpuscles. The Pacinian corpuscles are assumed to have sensitivity to pressure that is relatively high among human tactile receptors. This makes it possible to emphasize variation in a sense of pressure to be felt by the driver from the seat 10 when the acceleration acts on the vehicle 1.

Accordingly, it is possible to allow the driver to easily perceive the acceleration acting on the vehicle 1, and therefore to easily feel the sense of gripping of the tire. In addition, it is possible to allow for improvement in accuracy of the situation determination and the driving operation to be performed by the driver, which allows the driver to drive easily and feel a sense of security.

(2) The cushion vibrator 501 and the backrest vibrator 502 may be disposed to be separated away from each other in the front-rear direction. The amplitude of the vibration application waveform of the cushion vibrator 501 and the amplitude of the vibration application waveform of the backrest vibrator 502 may be caused to be different from each other depending on the acceleration in the front-rear direction of the vehicle 1. For example, the backrest vibrator 502 may apply vibration upon acceleration and the cushion vibrator 501 may apply vibration upon deceleration. This makes it possible to allow the driver to favorably perceive the acceleration in the front-rear direction. In one embodiment, the cushion vibrator 501 may serve as the "first vibration application unit". In one embodiment, the backrest vibrator 502 may serve as the "second vibration application unit".

(3) The right support vibrator 503 and the left support vibrator 504 may be disposed to be separated away from each other in the right-left direction. The amplitude of the vibration application waveform of the right support vibrator 503 and the amplitude of the vibration application waveform of the left support vibrator 504 may be caused to be different from each other depending on the acceleration in the right-left direction of the vehicle 1. For example, the right support vibrator 503 may apply vibration when the acceleration in the left direction acts and the left support vibrator 504 may apply vibration when the acceleration in the right direction acts. This makes it possible to allow the driver to favorably perceive the acceleration in the right-left direction.

(4) The amplitude of the vibration application waveform may be increased in accordance with an increase in the acceleration, and a ratio of an amount of an increase in the amplitude of the vibration application waveform to an amount of the increase in the acceleration, e.g., the slope of the line illustrated in each of FIGS. 12 and 13, may be decreased in accordance with an increase in an absolute value of the acceleration. This increases the ratio of the amount of the increase in the amplitude of the vibration application waveform to the amount of the increase in the acceleration in a region where the acceleration is relatively small, making it possible to effectively allow the driver to feel the occurrence of the acceleration. The region where the acceleration is relatively small may typically be a transitional state at the beginning of turning.

(5) The amplitude of the vibration application waveform may be decreased based on the detection of the slip state of the tire. This makes it possible to emphasize the variation in the sense of pressure to be felt by the driver from the seat 10 when the occurrence of the slip state of the wheel decreases lateral force that is to be produced by the tire and thereby causes a decrease or lack in the lateral acceleration.

It is thus possible to allow the driver to more appropriately recognize the sense of gripping of the vehicle 1, making it possible to further improve the accuracy of the driving operation to be performed on the vehicle 1.

(6) The amplitude of the vibration application waveform may be increased in accordance with an increase in the amplitude of the vibration input from the road surface. This makes it possible to secure the above-described effects by increasing the amplitude of the vibration application waveform even when the vibration transmitted from the road surface is increased, for example, by the roughness of the road surface or the pattern shape of the tire.

Modifications

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof (1) The respective configurations of the vehicle seat and the vehicle are not limited to those described above in the example embodiment and are modifiable as appropriate.

For example, an embodiment of the disclosure is applicable to a vehicle such as a hybrid electric vehicle (HEV) using both an engine and an electric motor or a vehicle that uses an internal combustion engine but not an electric motor as the traveling power source.

In addition, although the vehicle seat according to an embodiment of the disclosure is applicable for the driver's seat, the vehicle seat according to an embodiment of the disclosure is also applicable to any other seat such as a passenger seat or a back seat.

(2) According to the example embodiment, the vibration from the road surface may be detected based on the acceleration of the unsprung portion of the suspension. However, a method of detecting the vibration from the road surface is not limited thereto and is modifiable as appropriate.

For example, a vibration pickup may be provided at a pipe for the brake fluid, or a brake line, that is coupled to the wheel cylinder provided at the unsprung portion.

Alternatively, the vibration from the road surface may be detected based on the output of the torque sensor of the power steering system.

(3) According to the example embodiment, the rectangular wave may be used as an example of the vibration application waveform. However, this is non-limiting. For example, the vibration application waveform of any other waveform such as a sine wave, a triangular wave, or a random wave may be used. In addition, a method of adjusting a gain is not limited to that described in the example embodiment and is modifiable as appropriate.

(4) For example, the configuration of the vibrator or the vibration application unit, the principles of the vibration application, the location to provide the vibrator or the vibration application unit are not limited to those described in the example embodiment and are modifiable as appropriate.

(5) According to the example embodiment, the slip state of the vehicle may be detected based on the wheel speed of each wheel, i.e., the detected value of the vehicle speed sensor. However, a method of detecting the slip state of the vehicle is not limited thereto and is appropriately modifiable.

For example, the slip state may be detected based on: variation in the acceleration acting on the vehicle body; variation in the yaw rate; or variation in wheel acting force detected by a wheel acting force detector using information such as distortion of a wheel hub.

(6) According to the example embodiment, starting and stopping of the operation of the cushion vibrator 501 and the backrest vibrator 502 may be switched depending on the acting direction of the acceleration in the front-rear direction. However, alternatively, both the cushion vibrator 501 and the backrest vibrator 502 may be caused to operate and a difference in the amplitude may be provided between the cushion vibrator 501 and the backrest vibrator 502. For example, a ratio of vibration application force between the vibration application units on the front side and the rear side may be varied. In addition, starting and stopping of the operation of the right support vibrator 503 and the left support vibrator 504 may be switched depending on the acting direction of the acceleration in the right-left direction. However, alternatively, both the right support vibrator 503 and the left support vibrator 504 may be caused to operate and a difference in the amplitude may be provided between the right support vibrator 503 and the left support vibrator 504. For example, a ratio of vibration application force between the vibration application units on the right side and the left side may be varied.

The brake control unit 100, the hydraulic control unit 200, the motor generator control unit 300, the power steering control unit 400, and the vibrator control unit 500 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the brake control unit 100, the hydraulic control unit 200, the motor generator control unit 300, the power steering control unit 400, and the vibrator control unit 500. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the brake control unit 100, the hydraulic control unit 200, the motor generator control unit 300, the power steering control unit 400, and the vibrator control unit 500 illustrated in FIG. 1.

The invention claimed is:

1. A vehicle seat in which an occupant of a vehicle is to be seated, the vehicle seat comprising:

one or more vibrators each configured to apply vibration to a portion of the vehicle seat, the portion being to be in contact with the occupant; and a vibration application control processor configured to cause each of the one or more vibrators to vibrate with a vibration application waveform, the vibration application waveform comprising a frequency component that is higher than or equal to 100 hertz and lower than or equal to 300 hertz and comprising an amplitude that varies in accordance with acceleration acting on the vehicle, wherein the vibration application control processor is configured to make an increase in the amplitude of the vibration application waveform in accordance with an increase in the acceleration, and to decrease a ratio of an amount of the increase in the amplitude of the vibration application waveform to an amount of the increase in the acceleration in accordance with an increase in an absolute value of the acceleration.

2. The vehicle seat according to claim 1, wherein the one or more vibrators comprise a first vibrator and a second vibrator that are disposed to be separated away from each other in one or both of a width direction of the vehicle and a front-rear direction of the vehicle, and wherein the vibration application control processor is configured to cause the amplitude of the vibration application waveform of the first vibrator and the amplitude of the vibration application waveform of the second vibrator to be different from each other depending on a direction of the acceleration.

3. The vehicle seat according to claim 1, further comprising a slip state detector, wherein the slip state detector is configured to perform detection of a slip state of one or more wheels of the vehicle, and wherein the vibration application control processor is configured to decrease, based on the detection of the slip state, the amplitude of the vibration application waveform.

4. The vehicle seat according to claim 2, further comprising a slip state detector, wherein the slip state detector is configured to perform detection of a slip state of one or more wheels of the vehicle, and wherein the vibration application control processor is configured to decrease, based on the detection of the slip state, the amplitude of the vibration application waveform.

5. The vehicle seat according to claim 1, further comprising a vibration input detector configured to detect a vibration input from a road surface, wherein the vibration application control processor is configured to increase the amplitude of the vibration application waveform in accordance with an increase in an amplitude of the vibration input.

6. The vehicle seat according to claim 2, further comprising a vibration input detector configured to detect a vibration input from a road surface, wherein the vibration application control processor is configured to increase the amplitude of the vibration application waveform in accordance with an increase in an amplitude of the vibration input.

7. The vehicle seat according to claim 1, further comprising:

a seat cushion having an upper surface extending along a front-rear direction of the occupant; and a backrest having a backrest part extending upward from the seat cushion,
wherein the one or more vibrators comprise a first vibrator disposed in the seat cushion and a second vibrator disposed in the backrest.

8. The vehicle seat according to claim 7, wherein the one or more vibrators further comprise a third vibrator disposed on the backrest and separated away from the second vibrator in a width direction of the vehicle.

* * * * *